(12) United States Patent
Morad et al.

(10) Patent No.: US 6,757,329 B2
(45) Date of Patent: *Jun. 29, 2004

(54) VIDEO ENCODING DEVICE

(75) Inventors: Amir Morad, Tel Aviv (IL); Leonid Yavits, Haifa (IL)

(73) Assignee: Broadcom Corporation, Irvine, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 10/059,295

(22) Filed: Jan. 31, 2002

(65) Prior Publication Data

US 2002/0131501 A1 Sep. 19, 2002

Related U.S. Application Data

(63) Continuation of application No. 09/010,859, filed on Jan. 22, 1998, now Pat. No. 6,385,244.

(30) Foreign Application Priority Data

Nov. 25, 1997 (IL) .............................................. 122299

(51) Int. Cl.[7] .............................................. H04N 7/12
(52) U.S. Cl. .............................. 375/240.16; 375/240.01
(58) Field of Search ....................... 375/240.16, 240.01, 375/240.02, 240.12, 240.13; 382/232, 234, 236, 238, 253; 345/112; 348/394.1, 402.1, 403.1; H04N 7/12

(56) References Cited

U.S. PATENT DOCUMENTS 4,831,463 A * 5/1989 Faroudja ...................... 386/27
5,259,040 A * 11/1993 Hanna ......................... 382/107
5,260,783 A * 11/1993 Dixit ....................... 375/240.13
5,377,051 A * 12/1994 Lane et al. .................... 386/81
5,481,727 A * 1/1996 Asano et al. ................. 711/150
5,539,893 A * 7/1996 Thompson et al. .......... 711/122
5,598,483 A * 1/1997 Purcell et al. ............... 382/232
5,640,563 A * 6/1997 Carmon ....................... 718/102
5,832,445 A * 11/1998 Gao et al. ................. 704/200.1
5,940,542 A * 8/1999 Li et al. ....................... 382/253
6,067,322 A * 5/2000 Wang ..................... 375/240.17
6,157,677 A * 12/2000 Martens et al. ......... 375/240.16
6,188,381 B1 * 2/2001 van der Wal et al. ........ 345/581
6,192,075 B1 * 2/2001 Jeng et al. ................... 375/240
6,335,950 B1 * 1/2002 Kohn ..................... 375/240.16

* cited by examiner

Primary Examiner—Nhon Diep
(74) Attorney, Agent, or Firm—McAndrews, Held & Malloy, Ltd.

(57) ABSTRACT

A video encoding system includes a video source providing a multiple frame video signal, a compressed data interface, a host interface and a video encoding device. The video encoding device includes a video input processor, a global controller, a motion estimation processor, a digital signal processor and a bit-stream processor. The video input processor receives the video signal. The global controller controls the global operation of the video encoding device. The motion estimation processor is connected to the global controller. The digital signal processor is connected to the global controller and to the motion estimation processor. The bit-stream processor is connected to the digital signal processor, the global controller and the compressed data interface. The global controller stores encoding commands received from the host interface thereby programming the video input processor, the motion estimation processor, the digital signal processor and the bit-stream processor.

30 Claims, 10 Drawing Sheets

LOW RESOLUTION

| 1,1 | 2,1 |
|-----|-----|
| 1,2 | 2,2 |

A

FULL RESOLUTION

| 0,0 | 1,0 | 2,0 | 3,0 | 4,0 | 5,0 |
|-----|-----|-----|-----|-----|-----|
| 0,1 | 1,1 | 2,1 | 3,1 | 4,1 | 5,1 |
| 0,2 | 1,2 | 2,2 | 3,2 | 4,2 | 5,2 |
| 0,3 | 1,3 | 2,3 | 3,3 | 4,3 | 5,3 |
| 0,4 | 1,4 | 2,4 | 3,4 | 4,4 | 5,4 |
| 0,5 | 1,5 | 2,5 | 3,5 | 4,5 | 5,5 |

170

B

HYPER RESOLUTION

| 0,0 | 1,0 | 2,0 | 3,0 | 4,0 | 5,0 | 6,0 | 7,0 | 8,0 |
|-----|-----|-----|-----|-----|-----|-----|-----|-----|
| 0,1 | 1,1 | 2,1 | 3,1 | 4,1 | 5,1 | 6,1 | 7,1 | 8,1 |
| 0,2 | 1,2 | 2,2 | 3,2 | 4,2 | 5,2 | 6,2 | 7,2 | 8,2 |
| 0,3 | 1,3 | 2,3 | 3,3 | 4,3 | 5,3 | 6,3 | 7,3 | 8,3 |
| 0,4 | 1,4 | 2,4 | 3,4 | 4,4 | 5,4 | 6,4 | 7,4 | 8,4 |
| 0,5 | 1,5 | 2,5 | 3,5 | 4,5 | 5,5 | 6,5 | 7,5 | 8,5 |
| 0,6 | 1,6 | 2,6 | 3,6 | 4,6 | 5,6 | 6,6 | 7,6 | 8,6 |
| 0,7 | 1,7 | 2,7 | 3,7 | 4,7 | 5,7 | 6,7 | 7,7 | 8,7 |
| 0,8 | 1,8 | 2,8 | 3,8 | 4,8 | 5,8 | 6,8 | 7,8 | 8,8 |

VIDEO ENCODING DEVICE

CROSS REFERENCE TO RELATED APPLICATIONS

This application a continuation application of U.S. Ser. No. 09/010,859, filed Jan. 22, 1998, now U.S. Pat. No. 6,385,244 which is incorporated in its entirety by reference herein.

FIELD OF THE INVENTION

The present invention relates to video encoding devices in general and to single chip video encoding devices, in particular.

BACKGROUND OF THE INVENTION

Methods for encoding an audio-visual signal are known in the art. According to these methods, a video signal is digitized, analyzed and encoded in a compressed manner. These methods are implemented in computer systems, either in software, hardware or a combined software-hardware form.

Most hardware encoding systems consist of a set of semiconductor circuits, which are arranged on a large circuit board. State of the art encoding systems include a single semiconductor circuit, which is based on a high power processor.

Reference is now made to FIG. 1, which is a schematic illustration of a video encoding circuit, referenced 10, which is known in the art.

Circuit 10 includes a motion estimation processor 12, a motion estimation memory unit 14 connected to the motion estimation processor 12, a Reduced Instruction Set Computer (RISC) processor 16 connected to the motion estimation processor 12 and an image buffer 18, connected to RISC processor 16.

RISC processor 16 transfers a portion of video signal from image buffer 18 to memory unit 14. Motion estimation processor 12 analyzes the motion of the video signal. Motion estimation processor 12 utilizes memory unit 14 as a storage area for the video signal portion which is currently processed by it. When the motion estimation processor 12 completed analyzing the motion of a video signal portion, it transfers the results of the motion estimation analysis to the RISC processor 16.

The RISC processor 16 performs all other processing and encoding tasks which the video signal has to undergo, such as discrete COSINE transform (DCT), quantization, entropy encoding, bit-stream production and the like. The RISC processor 16 utilizes the image buffer 18 as a storage area for the video signal portion which is currently processed by it, and as a temporary storage for its computational purposes.

It will be appreciated by those skilled in the art that such encoding systems have several disadvantages. For example, one disadvantage of circuit 10 is that each of the processing units 12 and 16 have a separate storage area. Accordingly, each of the processed portions of video signal, such as and ISO/IEC 13818 (MPEG-2) macro-blocks, have to be transferred to both memory unit 14 and image buffer 18. RISC processor 16 has to access image buffer 18 for the same data, each time this data is required. Such Retrieval of large data blocks, many times, greatly increases data traffic volume over the encoding system data transmission lines.

Another disadvantage is that circuit 10 is able to execute all processing and encoding tasks in a serial manner, thereby capable of processing only a single macro-block at a time, requiring high operational processor frequencies. Circuit 10 receives a macro-block, processes it and produces an encoded bit-stream. Internally, the RISC processor 16 operates in the same manner.

Hence, as long as the RISC processor 10 hasn't completed transmitting the encoded bit-stream of a selected macro-block, it cannot receive the next macro-block.

It will be appreciated by those skilled in the art that the operational frequency of circuit 10 has a direct affect over the heat produced by it, thereby requiring large cooling elements as well as massive cooling devices such as fans and the like.

It will be appreciated by those skilled in the art that such circuit structure requires that input-output (I/O) operations have to be performed extremely fast, thereby greatly increasing the storage memory bandwidth requirements.

Another disadvantage of such systems is that all processing and encoding procedures (excluding motion estimation) are executed by the same RISC processor. In this case, the same circuit performs various types of computations, which makes the utilization of the processor's hardware resources very inefficient.

Methods for estimating motion in a video signal are known in the art. According to these methods a frame is compared with previous frames. The difference between the frames is used to estimate a level of motion. These methods analyze a frame and map it, thereby indicating areas in frame which have no motion over previous frames and areas in the frame which are assigned with a motion level.

According to one such like method each pixel in the search area is analyzed. This method requires a vast number of estimation operations and is thereby extremely resource consuming. This method is also called a full exhaustive search.

According to another method, known in the art, the search area is scanned in a center weighted manner, which can be logarithmic, and the like, whereby the center of the search area is scanned thoroughly at full resolution and the rest of the search area is scanned at lower resolution. Areas which detected as having some motion, in the low resolution search, are scanned again in full resolution. This reduces the overall number of estimation operations.

Reference is now made to FIG. 2, which is a schematic illustration of a Digital Signal Processing (DSP) processor, referenced 50, which is known in the art.

DSP processor 50 is of a single instruction multiple data (SIMD) type machine. It includes a plurality of identical processing units (P.U.) 52, 56, 60, 64. 68 and 72, and a random access memory (RAM) 61. RAM 61 is divided into segments 54, 58. 62, 66, 70 and 74.

Each memory segment is exclusively assigned and connected to a processing unit, whereas RAM segment units 54, 58, 62, 66, 70 and 74 are assigned to and connected to processing units (P.U.) 52, 56, 60, 64, 68 and 72, respectively.

This structure has several disadvantages. One disadvantage of such machine is that the same operation is performed by all of the processing units at same time.

Another disadvantage of the SIMD machine is that the data is not shared among the processing units. For example, processing unit 56 can access data contained in RAM segment 66 via processing unit 64 only. It cannot do so directly. It will be appreciated by those skilled in the art that such a configuration is inefficient.

A further disadvantage is that individual operations that vary for different data items cannot be efficiently performed by an SIMD machine. The programming of such operations into the processing units, is very difficult. Such individual operations can be only performed in a serial manner, while masking all irrelevant data, resulting in shutting off most of the processing units. The utilization of the hardware resources in an SIMD machine during such programming operations is very low, and performance of the machine are dramatically decreased.

Another disadvantage relates to the interconnection structure between the processing units. It will be appreciated that, a processing unit within an SIMD machine is connected to a limited number of neighboring processing units. Hence communication between such a processing unit and a processing unit not connected thereto, is often a complex operation.

Bit-stream processing and generation, in a conventional encoding circuit, is performed by a general purpose processor. Bit-stream generation requires some specific operations, which can not be performed efficiently by a general purpose processor. In order to perform such special operation, a general purpose processor uses a small portion of its processing resources, while shutting off rest of them. Therefore, the disadvantage is that the resources of such processor are not utilized efficiently.

SUMMARY OF THE PRESENT INVENTION

It is an object of the present invention to provide a novel device for encoding an audio-visual signal, which overcomes the disadvantages of the prior art.

There is therefore provided, in accordance with a preferred embodiment of the present invention, a video encoding system which includes a video source providing a multiple frame video signal, a compressed data interface, a host interface and a video encoding device. The video encoding device includes a video input processor, a global controller, a motion estimation processor, a digital signal processor and a bit-stream processor. The video input processor receives the video signal. The global controller controls the global operation of the video encoding device. The motion estimation processor is connected to the global controller. The digital signal processor is connected to the global controller and to the motion estimation processor. The bit-stream processor is connected to the digital signal processor, the global controller and the compressed data interface. The global controller stores encoding commands received from the host interface thereby programming the video input processor, the motion estimation processor, the digital signal processor and the bit-stream processor.

There is also provided, in accordance with a preferred embodiment of the present invention, a video camera including an optical assembly, a light sensitive device, detecting light via the optical assembly, thereby producing a video signal and a video encoding device, connected to the light sensitive device. The video encoding device includes a video source providing a multiple frame video signal, a compressed data interface, a host interface and a video encoding device. The video encoding device includes a video input processor, a global controller, a motion estimation processor, a digital signal processor and a bit-stream processor. The video input processor receives the video signal. The global controller controls the global operation of the video encoding device. The motion estimation processor is connected to the global controller. The digital signal processor is connected to the global controller and to the motion estimation processor. The bit-stream processor is connected to the digital signal processor, the global controller and the compressed data interface. The global controller stores encoding commands received from the host interface thereby programming the video input processor, the motion estimation processor, the digital signal processor and the bit-stream processor.

BRIEF DESCRIPTION OF THE DRAWINGS

The present invention will be understood and appreciated more fully from the following detailed description taken in conjunction with the drawings in which:

FIG. 6 is a schematic illustration of a video frame, including three resolution representation of a portion of this frame;

DETAILED DESCRIPTION OF PREFERRED EMBODIMENTS

The present invention overcomes the disadvantages of the prior art by providing a novel approach to video compression processing and a novel structure for a device, according to this approach.

The device according to the invention is a massively parallel digital video processor designed; for the purpose of real-time video encoding, like MPEG. This device can be incorporated in a single chip, and installed in digital camcorders, recordable digital video disk (DVD), PC and workstation multimedia, educational and training systems, video conferencing, broadcast equipment, security, content creation/authoring/video editing equipment, and the like.

Figure 3:
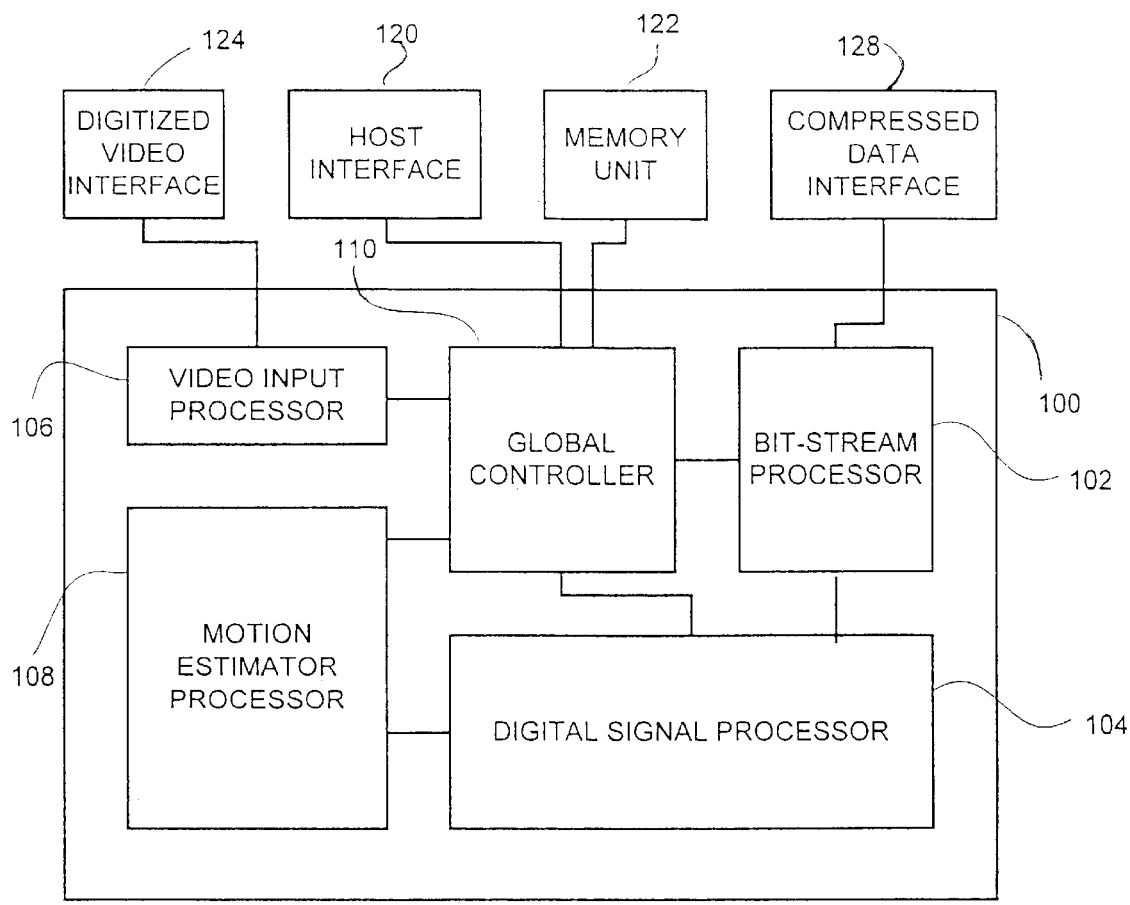
FIG. 3 is a schematic illustration of a video encoding device, constructed and operative in accordance with a preferred embodiment of the invention.

Reference is now made to FIG. 3, which is a schematic illustration of a video encoding device, generally referenced 100, constructed and operative in accordance with a preferred embodiment of the invention.

Device 100 includes a video input processor 106, a motion estimation processor 108, a digital signal processor 104, a bit-stream processor 102 and a global controller 110.

The video input processor 106 is connected to the global controller 110. The motion estimation processor 108 is connected to the global controller 110 and to the digital signal processor 104. The digital signal processor 104 is connected to the global controller 110 and to the bit-stream processor 102, which is also connected to the global controller 110.

The bit-stream processor 102 is further connected to a compressed data interface 128. The global controller 110 is further connected to a host interface 120 and to a memory unit 122. The input of the video input processor 106 is further connected to a digital video source (not shown) via a digital video interface 124. Such a host is typically a user interface which is operative to receive commands, operational parameters, and the like, from a user or a supervising system and also to provide to the user information received from device 100.

Device 100 operates in two modes: a programming mode and an operational mode. Device 100 is operative to run according to both modes at the same time. In the programming mode, an external host transfers the data and control parameters to the global controller 110, via the host interface 120.

The global controller 110 can transfer the data and control signals to the video input processor 106, motion estimation processor 108, digital signal processor 104 and bit-stream processor 102.

In the operational mode, the video input processor 106 captures motion video signal from an external video source via the digitized video interface 124. Video input processor 106 also performs preprocessing of the video signal, such as spatial filtering, noise reduction, image quality improvement, image size adjustment, and the like, color format conversion, and the like, thereby producing preprocessed video data.

Video input processor 106 accumulates the preprocessed video data into data blocks and transfers them to the global controller 110. Global controller 110 stores the data blocks in memory unit 122. In the present example, the device operates under MPEG-2 video compression standard. Hence, a data block represents an MPEG-2 macro-block, which is a sixteen by sixteen [16×16] matrix of luminance pixels and two, four or eight, eight by eight [8×8] matrices of chrominance pixels, as defined by the MPEG-2 standard. A reference frame represents a picture which is compared versus current picture during the motion estimation.

The global controller 110 retrieves a current picture macro-block and reference picture macro-blocks from the memory unit 122 and loads them to the motion estimation processor 108. Motion estimation processor 108 compares the current picture macro-block with the respective reference frame macro-blocks, thereby producing an estimation of the motion of the current picture macro-block.

The motion estimation processor 108 uses this estimation to remove temporal redundancy of the video signal, as will be described in detail hereinbelow. The motion estimation processor 108 transfers the resulting motion estimation data to the global controller 110. Motion estimation processor 108 also transfers the current picture macro-block and the corresponding reference frames macro-blocks to the digital signal processor 104.

Digital signal processor 104 (DSP) executes procedures which are intended to remove the spatial redundancy of the video signal, thereby producing a sequence of compression commands, as will be described in detail hereinbelow. This sequence of compression commands includes instruction as to which frame of the original video signal is to be compressed into an I-frame, a B-frame or a P-frame, and according to which reference frames.

Then, the digital signal processor 104 transfers the sequence of compressed data to the bit-stream processor 102 and to the global controller 110. The bit-stream processor 102 performs a series of encoding procedures, such as entropy encoding, and the like, as will be described in detail hereinbelow.

The bit-stream processor 102 compresses data into an MPEG-2 standard format data, in accordance with the sequence of compression commands.

Then, the bit-stream processor 102 transfers the MPEG-2 standard format data to the compressed data interface 128. It will be noted that compressed data interface 128 can be connected to any data receptacle element such as a storage unit or a communication transmission line.

Global controller 110 controls and schedules the video input processor 106, the motion estimation processor 108, the digital signal processor 104 and the bit-stream processor 102.

Global controller 110 also governs the data transfer among the motion estimation processor 108, digital signal processor 104 and the bit-stream processor 102.

The global controller 110 also connects between the external host and video input processor 106, motion estimation processor 108, digital signal processor 104 and bit-stream processor 102. In the operational mode, an external host can access the register file 408 (FIG. 10) of global controller 110 for read and/or write operations.

According to one aspect of the invention, in operational mode, macro-blocks are fed into device 100, in a horizontal or vertical raster scan manner, from the top left macro-block through to the right bottom macro-block, of a specified frame. Device 100 processes a number of successive macro-blocks, at the same time. For example, while the bit-stream processor 102 processes the i-th macro-block, digital signal processor 104 processes the i+1-th macro-block and motion estimation processor 108 processes the i+2-th through i+4-th macro-blocks.

According to another example, while the bit-stream processor 102 processes the i-th macro-block, digital signal processor 104 processes the k-th macro-block and motion estimation processor 108 processes the j-th through j+m-th macro-blocks, wherein i<k<j and m≧1.

Device 100 overcomes a disadvantage of the prior art by using memory unit 122 as a shared storage area which is accessible to all of its internal units, via global controller 110. In the present example, all access to storage unit 122 is provided via global controller 110.

Figure 4:
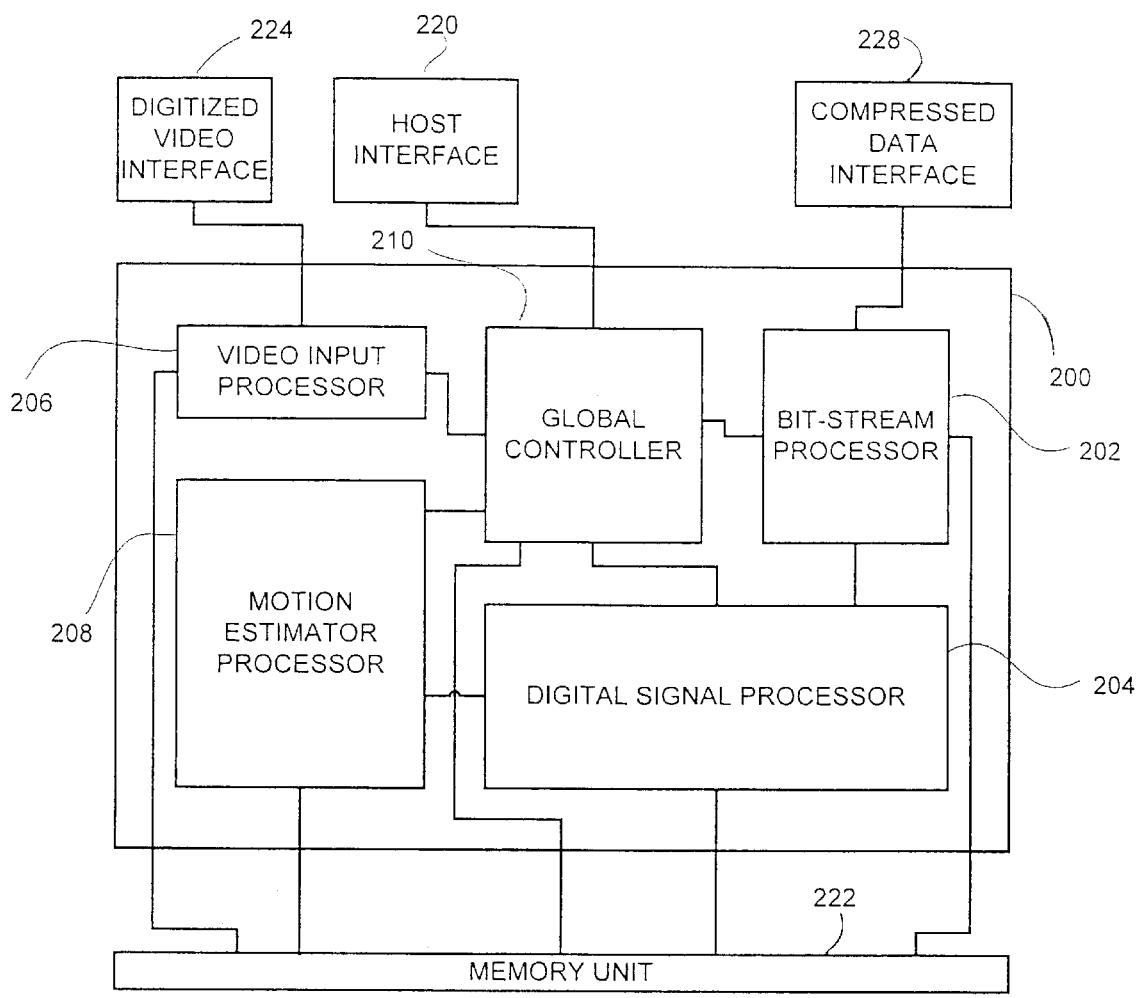
FIG. 4 is a schematic illustration of a video encoding device, constructed and operative in accordance with another preferred embodiment of the invention.

Reference is now made to FIG. 4, which is a schematic illustration of a video encoding device, generally referenced 200, constructed and operative in accordance with another preferred embodiment of the invention.

Device 200 is generally similar to device 100 and includes a video input processor 206, a motion estimation processor 208, a digital signal processor 204, a bit-stream processor 202 and a global controller 210.

Device 200 is also connected to a compressed data interface 228, a memory unit 222, a digital video source (not shown) via a digital video interface 224 and a host interface 220. In device 200, all of the internal components are connected directly to memory unit 222.

Accordingly, video input processor 206, motion estimation processor 208, digital signal processor 204, bit-stream processor 202 and global controller 210 can, each, access any storage address within memory unit 222, directly, thereby performing any I/O operation.

It will be noted that a shared memory structure according to the invention can include a combination of the examples disclosed in FIGS. 3 and 4, whereby some components are directly connected to memory unit and the rest are connected to the memory unit via a mediating element, such as global controller 110.

Referring back to FIG. 3, it is noted that according to another aspect of the invention, memory unit 110 can partitioned into many sub-areas, whereby each of the internal units of device 100, is granted an access level which is selected from a list of access levels such as read-write, read only, write only, no access and the like. It will be appreciated by those skilled that such a structure provides tremendous flexibility, whereby the amount of memory assigned to a selected internal unit can be increased or decreased dynamically, in real-time.

Figure 1:
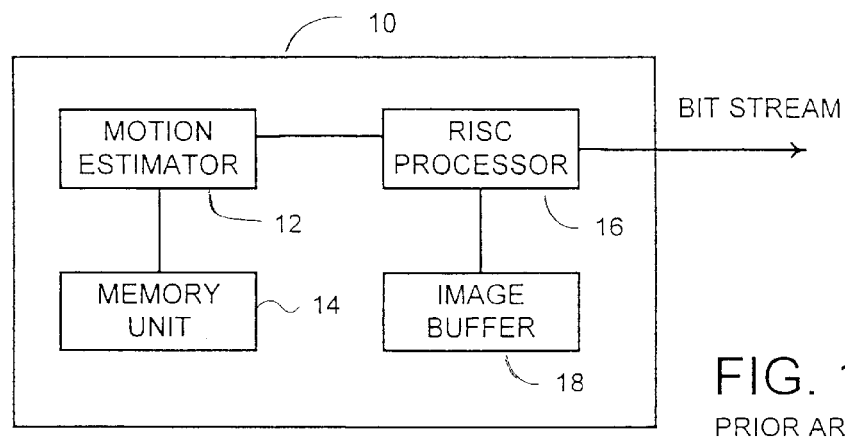
FIG. 1 is a schematic illustration of an encoding circuit, known in the art.
Figure 2:
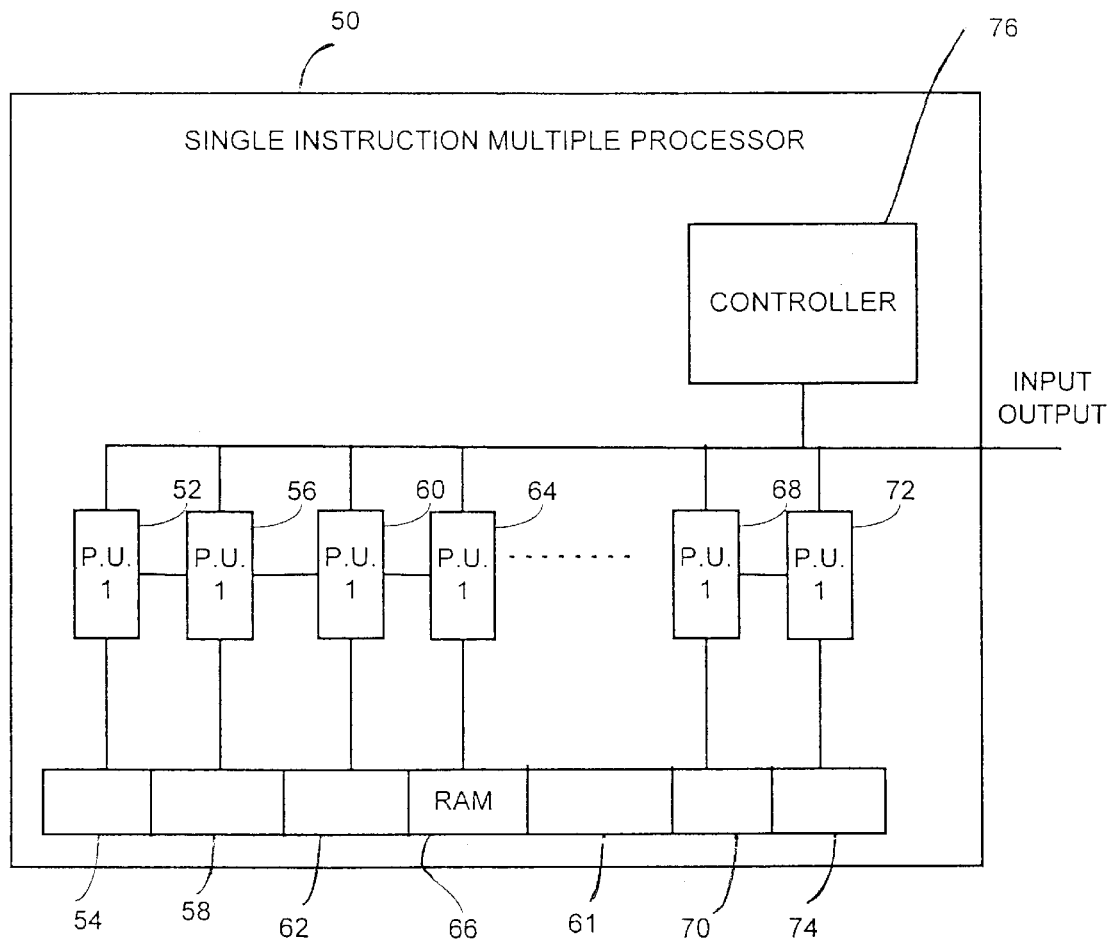
FIG. 2 is a schematic illustration of an DSP unit, which is known in the art.

According to another aspect of the present invention, device 100 performs different processing and encoding procedures in parallel, by processing a number of successive macro-blocks simultaneously. Hence, a selected macro-block is permitted to be present in the device 100 for an extended period of time, with comparison to device 10 (FIG. 1), thereby greatly reducing the operational frequency of device 100, by factor of at least five.

Figure 5:
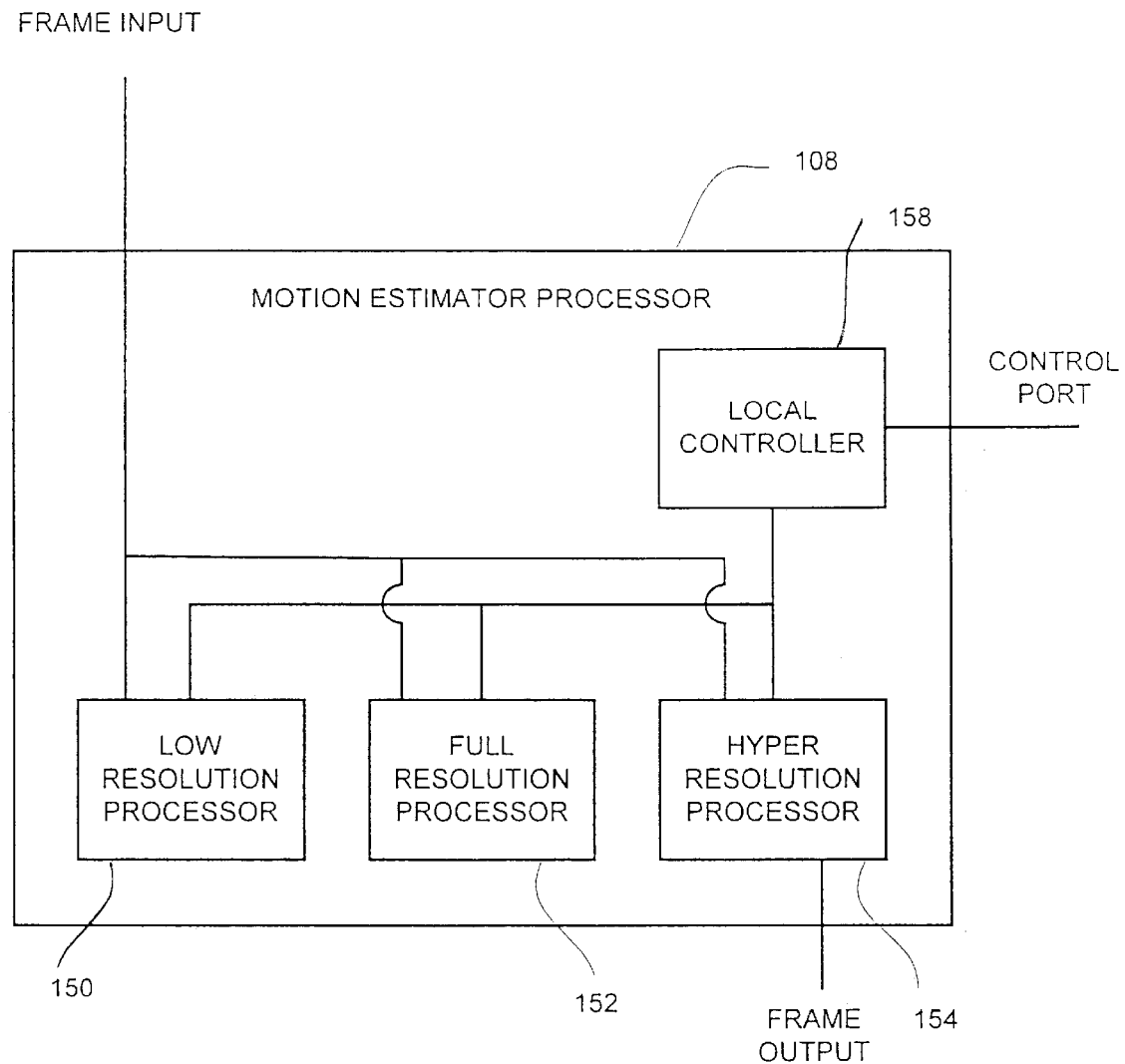
FIG. 5 is a schematic illustration in detail of the motion estimation processor, of the video encoding device of the device of FIG. 3, constructed and operative in accordance with a further preferred embodiment of the invention.

Reference is now made to FIGS. 5 and 6. FIG. 5 is a schematic illustration in detail of motion estimation processor 108, constructed and operative in accordance with a further preferred embodiment of the invention. FIG. 6 is a schematic illustration of a video frame, generally referenced 170, including three resolution representation of a portion of this frame, generally referenced A, B and C.

Motion estimation processor 108 includes a low resolution processor 150, a full resolution processor 152, a hyper resolution processor 154 and a local-controller 158. The frame input of the motion estimation processor 108 is connected to the inputs of the low resolution processor 150, the full resolution processor 152, the hyper resolution processor.

The frame output of motion estimation processor 108 is connected to the hyper resolution processor 154. The local-controller 158 is connected to the low resolution processor 150, the full resolution processor 152 and the hyper resolution processor and the control port of the motion estimation processor 108, which is connected to global controller 110 (FIG. 3).

Referring now to FIG. 6, frame 170 is a [6×6] matrix which includes a digital representation of a video frame $F_i$. The currently scanned block is block B, which is a [4×4] matrix from pixel B:(1,1) to pixel B:(4,4). Frame 170 is provided to processors 150, 152 and 154 (FIG. 5).

Referring back to FIG. 5, motion estimation processor 108 can operate in two modes: a programming mode and an operational mode. The motion estimation processor can operate according to both modes at the same time.

In the programming mode, the global controller 110 (FIG. 3) provides control parameters as well as data parameters, to micro-controller 158, via the control port.

Local-controller 158 controls and synchronizes processors 150, 152 and 154. According to a preferred embodiment of the present invention, processors 150, 152 and 154 operate either in a parallel or in a serial manner.

In an example of parallel operation, the low resolution processor 150 processes i-th macro-block, while the full resolution processor 152 processes I−1-th macro-block, whereas the hyper resolution processor 154 processes I−2-th macro-block, all at the same time.

In an example of serial operation, the low resolution processor 150 processes i-th macro-block, while both full resolution processor 152 and the hyper resolution processor 154 process I+1-th macro-block in a serial manner.

Low resolution processor 150 operates as follows. The global controller 110 loads the current picture macro-block and the reference pictures data blocks into the low resolution processor 150. The low resolution processor 150 performs a resolution reduction, resulting in decreasing the amount of image data. The low resolution processor 150 can perform the resolution reduction by different methods, like decimation, low pass filtering, non-linear filtering, and the like.

Reference is now made to FIG. 6. In the present example, low resolution processor 150 (FIG. 5) generates a low resolution block A from block B. Block A is a [2×2] matrix, wherein pixel A:(1,1) is a combined representation of pixels B:(1,1), B:(1,2), B:(2,1) and B:(2,2), pixel A:(2,1) is a combined representation of pixels B:(3,1), B:(3,2), B:(4,1) and B:(4,2), pixel A:(1,2) is a combined representation of pixels B:(1,3), B:(1,4), B:(2,3) and B:(2,4) and pixel A:(2,2) is a combined representation of pixels B:(3,3), B:(3,4), B:(4,3) and B:(4,4).

It will be noted that such pixel combination can be performed in many ways such as calculating the average value of the combined pixels, selecting the dominant one, and the like.

The resolution reduction of the present example is at a ratio of 1:4. It will be noted that low resolution processor 150 can perform a resolution reduction at any ratio desired.

After low resolution processor completes the resolution reduction, then, it performs a search procedure. The low resolution processor 150 can performs different types of search, like full exhaustive search, telescopic search, and the like, thereby producing low resolution motion analysis. After the search is completed, the global controller 110 (FIG. 3) reads the low resolution motion analysis data from the low resolution processor 150, via the local controller 158.

Full resolution processor 152 operates as follows: The global controller 110 loads the current picture block (referenced B in FIG. 6) and the reference pictures data block into the full resolution processor 152, according to the low resolution motion analysis. Then, the full resolution processor 152 performs a search procedure.

The full resolution processor 152 can perform different types of search, like full exhaustive search, telescopic search, and the like, thereby producing full resolution motion analysis. After the search is completed, the global controller 110 reads the full resolution motion analysis data from the full resolution processor 152, via the local controller 158.

Full resolution processor 152 and hyper resolution processor 154 can have a shared storage area. This aspect of the invention reduces the memory requirements of the encoding system.

Hyper resolution processor 154 operates as follows: The global controller 110 loads the current picture macro-block and the reference pictures data blocks into the hyper resolution processor 154. The hyper resolution processor 154 multiplies the resolution of the image data, enabling a motion prediction with a resolution higher than a single pixel step.

Hyper resolution processor 154 can perform the resolution multiplication by different methods, like zero order interpolation, first order interpolation, and the like.

With reference to FIG. 6, in the present example, hyper resolution processor 154 (FIG. 5) generates a hyper resolution block C from block B. Block C is a [9×9] matrix, wherein pixels C:(1,1), C:(3,1), C:(5,1), C:(7,1), C:(1,3), C:(3,3), C:(5,3), C:(7,3), C:(1,5), C:(3,5), C:(5,5), C:(7,5), C:(1,7), C:(3,7), C:(5,7) and C:(7,7) are equal to pixels B:(1,1), B:(2,1), B:(3,1), B:(4,1), B:(1,2), B:(2,2), B:(3,2), B:(4,2), B:(1,3), B:(2,3), B:(3,3), B:(4,3), B:(1,4), B:(2,4), B:(3,4) and B:(4,4), respectively.

Each other pixel in block C: can be an interpolation of selected B: pixels adjacent to its respective place therein. For example, pixel C:(2,2) is an interpolation of pixels B:(1,1), B:(1,2), B:(2,1) and B:(2,2). Pixel C:(2,1) is an interpolation of pixels B:(1,1), and B:(2,1). Pixel C:(1,0) is an interpolation of pixels B:(1,0), and B:(1,1).

The resolution enhancement of the present example is at a ratio of 4:1. It will be noted that hyper resolution processor 154 can perform a resolution enhancement at any ratio desired.

After the hyper resolution processor 154 completes the resolution multiplication, it performs a search procedure. The hyper resolution processor 154 can perform different types of search, like full exhaustive search, telescopic search, and the like, thereby producing hyper resolution motion analysis. After the search is completed, the global controller 110 reads the hyper resolution motion analysis data, from the hyper resolution processor 154, via the local controller 158.

A motion estimation processor according to another embodiment of the invention can include as many resolution processors as desired, wherein some resolution processors are low resolution processors, at a variety of low resolutions and other resolution processors are hyper resolution processors, at a variety of hyper resolutions.

Figure 7:
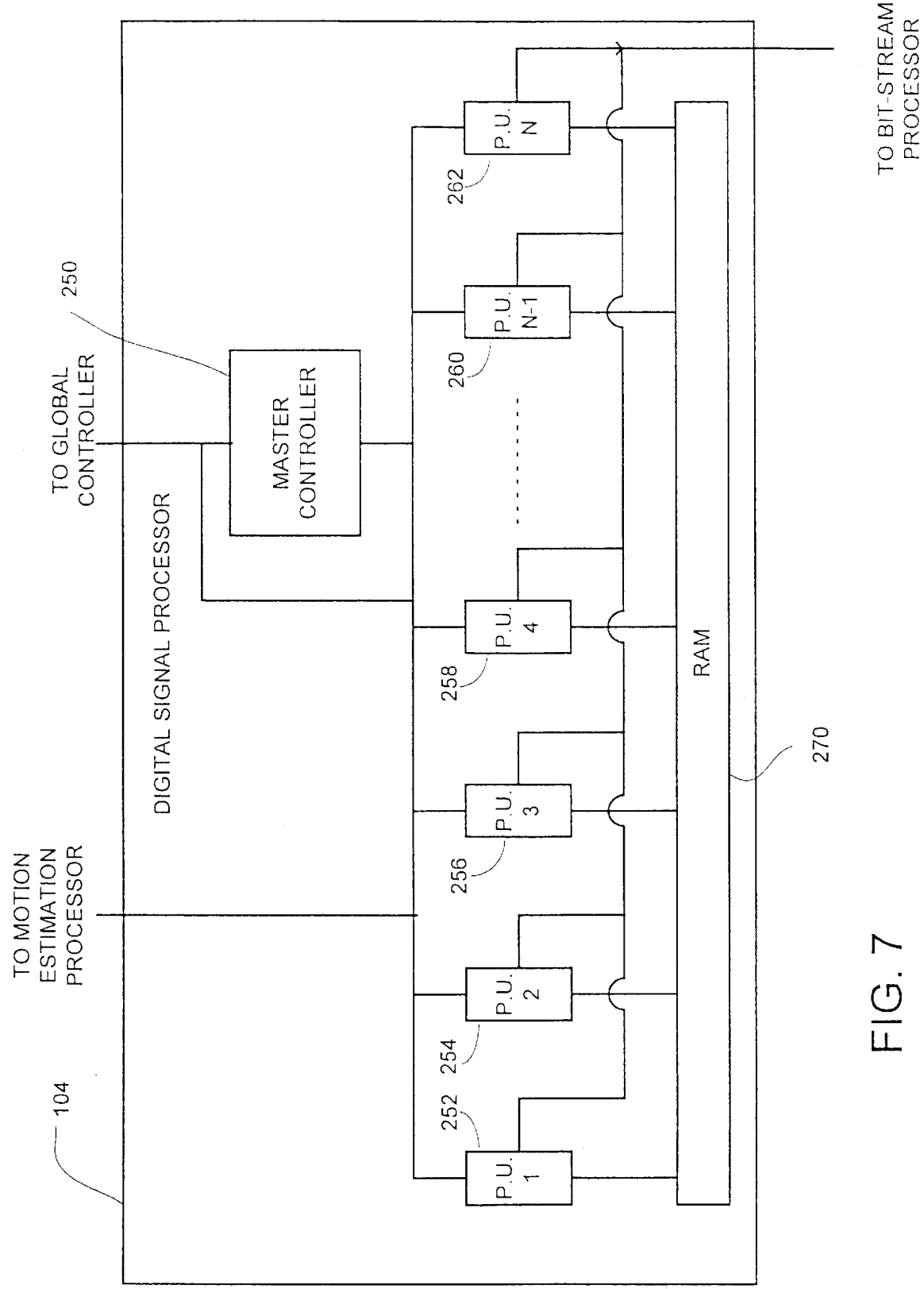
FIG. 7 is a schematic illustration in detail of the digital signal processor, of the video encoding device of FIG. 3, constructed and operative in accordance with another preferred embodiment of the invention.

Reference is now made to FIG. 7, which is a schematic illustration in detail of digital signal processor 104, of FIG. 3, constructed and operative in accordance with another preferred embodiment of the invention.

Digital signal processor 104 includes a master controller 250, a random access unit (RAM) 270 and N processing units 252, 254, 256, 258, 260 and 262. Each processing unit 252, 254, 256, 258, 260 and 262 is connected to the master controller 250 and to the RAM 270.

The processing units 252, 254, 256, 258, 260 and 262 are further connected to motion estimation processor 108 and to the global controller 110 (FIG. 3), for retrieving macro block data therefrom.

Digital signal processor 104 can operate in two modes: a programming mode and an operational mode. Digital signal processor 104 can operate according to both modes at the same time. In the programming mode, the global controller 110 (FIG. 3) transfers data and control parameters to/from master controller 250. The master controller 250 can independently program each processing unit 252, 254, 256, 258, 260 and 262.

In the operational mode, the master controller 250 and all processing units 252, 254, 256, 258, 260 and 262, operate in parallel. The motion estimation processor 108 (FIG. 3) transfers the current macro-block and the reference macro-blocks data to the processing units 252, 254, 256, 258, 260 and 262 of the digital signal processor 104. In the present example, the motion estimation processor 108 (FIG. 3) provides luminance macro-blocks and the global controller 110 provides chrominance macro-blocks retrieved from memory unit 122.

The global controller 110 transfers the appropriate data (like motion vectors, macro-block type, perdition type, and the like) to the master controller 250. The master controller 250 performs special processing procedures such as like rate control, DCT type selection, macro-block type selection and the like.

The master controller 250 distributes control instructions to the processing units 252, 254, 256, 258, 260 and 262, and receives processed data from each of these processing units. Processing units 252, 254, 256, 258, 260 and 262 perform processing procedures on large data blocks, such as discrete cosine transform (DCT), inverse discrete cosine transform (IDCT), quantization, inverse quantization, frame type decisions, and the like.

Each of these processing units processes different data blocks. Each processing unit can access the data blocks associated with other processing units, in RAM 270. All processing unit can execute different operations in parallel. The processing units transfer the processed coefficient data to the bit-stream processor 102 (FIG. 3). The master controller 250 of the digital signal processor 104 transfers the appropriate data (like macro-block type, DCT type, quantizer scale, etc.) to the global controller 110 (FIG. 3).

The present invention overcomes the disadvantages of the prior art by configuring the master controller 250 so as to perform individual processing tasks on some data items while the processing units 252, 254, 256, 258, 260 and 262, simultaneously perform massive processing tasks on large data blocks.

According to the present example, the master controller 250 temporarily assigns a storage area in RAM 270, to each of the processing unit 252, 254, 256, 258, 260 and 262.

Hence, each processing unit 252, 254, 256, 258, 260 and 262 can access the data which is associated with the other processing units. It will be appreciated by those skilled in the art that such a structure greatly enhances the efficiency of processing and data transfer operations in DSP 104. Such parallel access structure of the processing units also allows very fast and efficient data transfer to and from the digital signal processor 104.

Figure 8:
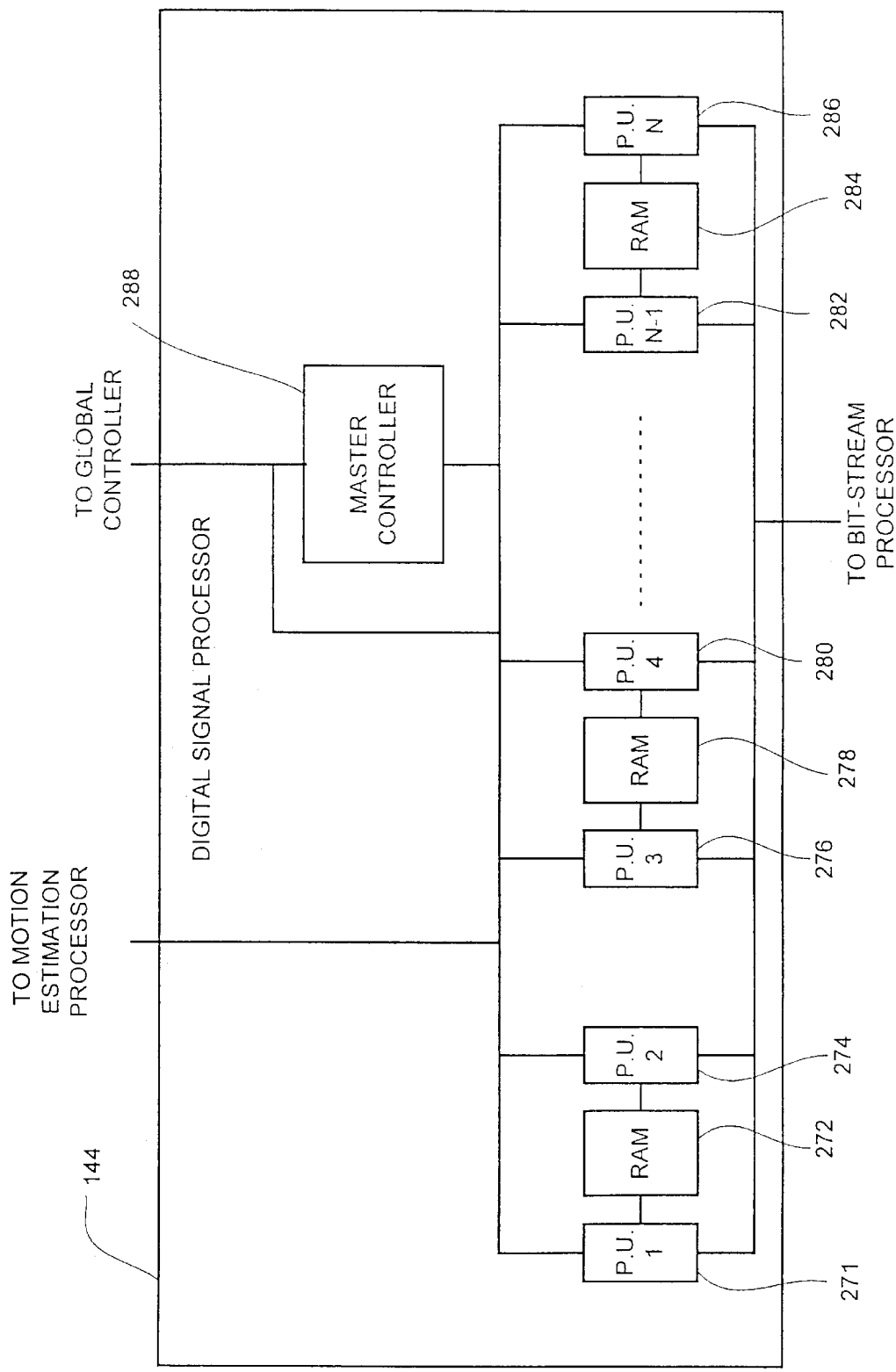
FIG. 8 is a schematic illustration in detail of a digital signal processor, constructed and operative in accordance with a further preferred embodiment of the invention.

Reference is now made to FIG. 8, which is a schematic illustration in detail of a digital signal processor, generally referenced 144, constructed and operative in accordance with a further preferred embodiment of the invention.

Digital signal processor 144 is generally similar to digital signal processor 104, with a slightly different memory structure. Digital signal processor 144 includes a master controller 288, N processing units 271, 274, 276, 280, 282 and 286 and N/2 random access units (RAM) 272, 278 and 284.

Each RAM unit is connected to two processing unit. Processing units 271 and 274 are connected to RAM unit 272. Processing units 276 and 280 are connected to RAM unit 278. Processing units 282 and 286 are connected to RAM unit 284.

Each processing unit is able to access any address in the RAM unit connected thereto.

According to FIGS. 7 and 8 it will be appreciated that the invention is not limited to any shared memory structure between processing units.

Figure 9:
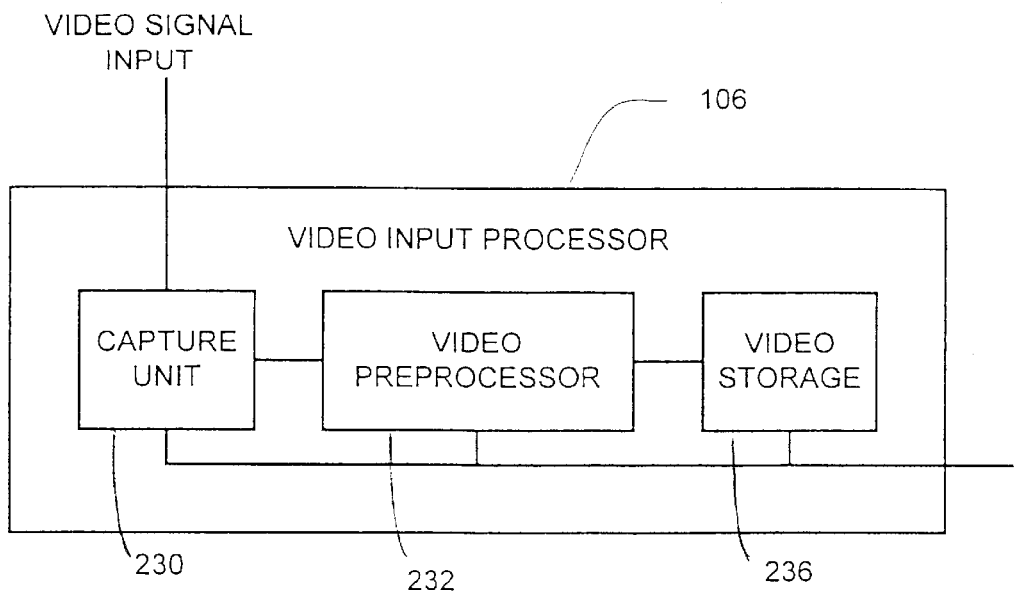
FIG. 9 is a schematic illustration in detail of the video input processor, of the encoding device of FIG. 3, constructed and operative in accordance with a further preferred embodiment of the invention.

Reference is now made to FIG. 9, which is a schematic illustration in detail of video input processor 106, of FIG. 3, constructed and operative in accordance with a further preferred embodiment of the invention.

Video input processor 106 includes a video capture unit 230, a video preprocessor 232 and a temporary video storage 236. The inputs of the video capture unit 230, the video preprocessor 232 and the temporary video storage 236 are connected to the video input processor 106 (FIG. 3). The input of the video capture unit 230 is connected to video input processor 106. The video capture unit 230 is connected to the video preprocessor 232. The video preprocessor 232 is connected to the temporary video storage 236. The output of the temporary video storage 236 is connected to the global controller 110.

Video input processor 106 operates in two modes: programming and operational. Video input processor 106 is operative to run according to both modes at the same time. In the programming mode, the global controller 110 (FIG. 3) loads data and control parameters to the video capture unit 230, to the video preprocessor 232 and to the temporary video storage 236.

In the operational mode, the video capture unit 230 acquires the input video signal. The video capture unit 230 is self synchronized with the input video signal, according to its format (NTSC, PAL, SECAM, and the like), programmable resolution (D1, SIF, QSIF, and the like), and the like.

The video capture unit 230 also provides video synchronization signals (like a new frame start, a new field start, etc.) to the global controller 110.

The video preprocessor 232 performs a series of video processing procedures to enhance the captured video signal. The video processing procedures can include a color format conversion, size reduction, noise reduction, edge sharpening, image quality improvement, and the like.

The temporary video storage 236 accumulates the processed video signal and provides a "data ready" signal to the global controller 110 (FIG. 3). The global controller 110 reads the accumulated image data from the temporary video storage 236. The global controller 110 also provides control signals to the video input processor 106.

The usage of the temporary video storage 236 allows to efficiently adjust the data rates of an external video signal and the internal data transfer. The video input processor 106 can accumulate the processed video signal in a real time variable rate whereas the global controller 110 can transfer the accumulated data to the memory unit 122 in a burst. This greatly reduces the memory bandwidth requirements, and makes the usage of a memory unit 122 more efficient.

Figure 10:
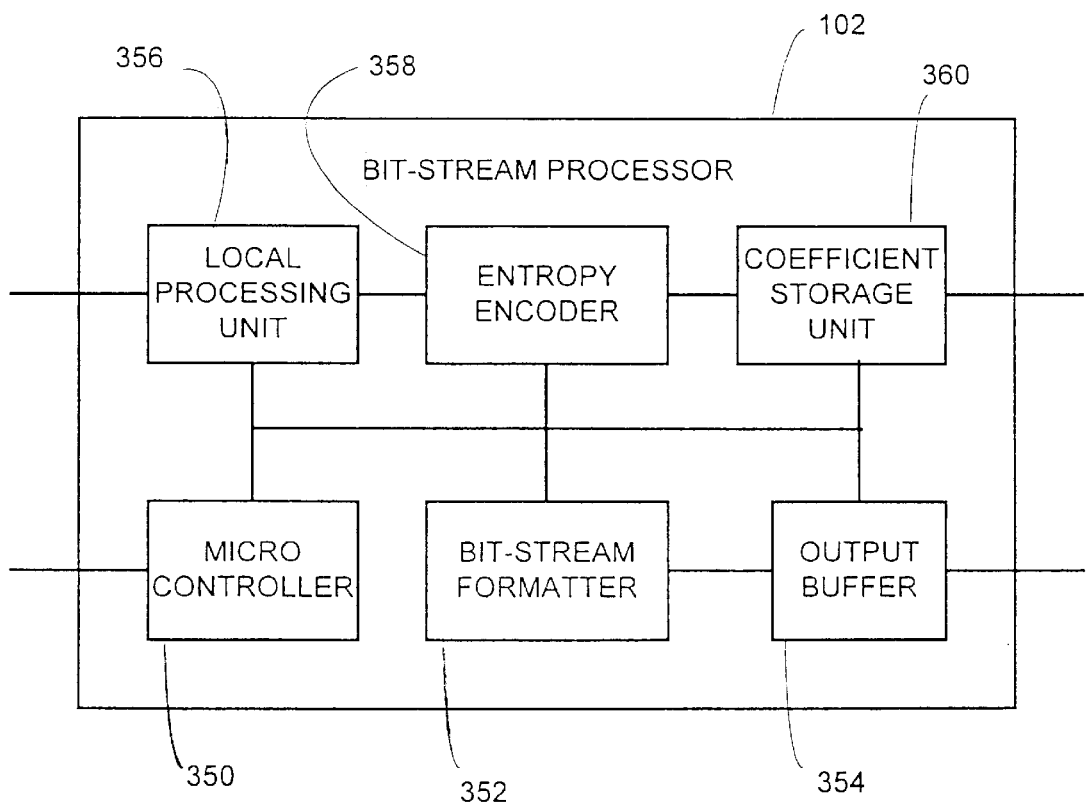
FIG. 10 is a schematic illustration in detail of the bit-stream processor, of the encoding device of FIG. 3, constructed and operative in accordance with another preferred embodiment of the invention.

Reference is now made to FIG. 10, which is a schematic illustration in detail of bit-stream processor 102, of FIG. 3, constructed and operative in accordance with a further preferred embodiment of the invention.

Bit-stream processor 102 includes a local processing unit 356, an entropy encoder 358, a temporary coefficient storage 360, a bit-stream formatter 352, an output buffer 354 and a micro-controller 350. The input of the bit-stream processor 102 is connected to the input of the temporary coefficient storage 360 and of the local processing unit 356. The temporary coefficient storage 360 is connected to the entropy encoder 358. The entropy encoder 358 is further connected to the local processing unit 356 and to the bit-stream formatter 352. The local processing unit 356 is further connected to the output of the bit-stream processor 102. The bit-stream formatter 352 is connected to the output buffer 354. The output of the output buffer 354 is connected to the output of the bit-stream processor 102. The input of the micro-controller 158 is connected to the input of the bit-stream processor 102. The micro-controller 158 of the bit-stream processor 102 is connected to the processing unit, the entropy encoder 358, temporary coefficient storage 360, bit-stream formatter 352 and output buffer 354.

The bit-stream processor 102 can operate in two modes: programming and operational. Bit-stream processor 102 is operative to run according to both modes at the same time.

In the programming mode, the global controller 110 (FIG. 3) loads the data and control parameters to micro-controller 350 and to local processing unit 356. The digital signal processor 104 (FIG. 3) loads the processed coefficients to the temporary coefficient storage 360.

In the operational mode, the entropy encoder 358 loads the data from the local processing unit 356 registers and the temporary coefficient storage 360. The entropy encoder 358 performs a series of encoding procedures, like zigzag/alternate scan, run-length encoding, variable length encoding of data, and the like, thereby producing encoded data.

The local processing unit 356 performs arithmetic and logical operations required to support the entropy encoding. The local processing unit 356 also provides a temporary storage for the data loaded from the global controller 110 (FIG. 3) in the programming mode.

The bit-stream formatter 352 reads the encoded data from the entropy encoder 358 and formats it into a standard bit-stream. The output buffer 354 provides a temporary storage to the bit-stream data. The micro-controller 350 provides the control and synchronization signals to the local processing unit 356, the entropy encoder 358, the temporary coefficient storage 360, the bit-stream formatter 352 and the output buffer 354.

The global controller 110 can put the bit-stream processor 102 into programming or operational mode by loading an appropriate control signal to the micro-controller 158 of the bit-stream processor 102.

Entropy encoding and computational operations in the bit-stream processor 102 are performed in parallel, by operating entropy encoder 358 and processing unit 356, simultaneously. This allows a very efficient utilization of the bit-stream processor 102 resources.

Figure 11:
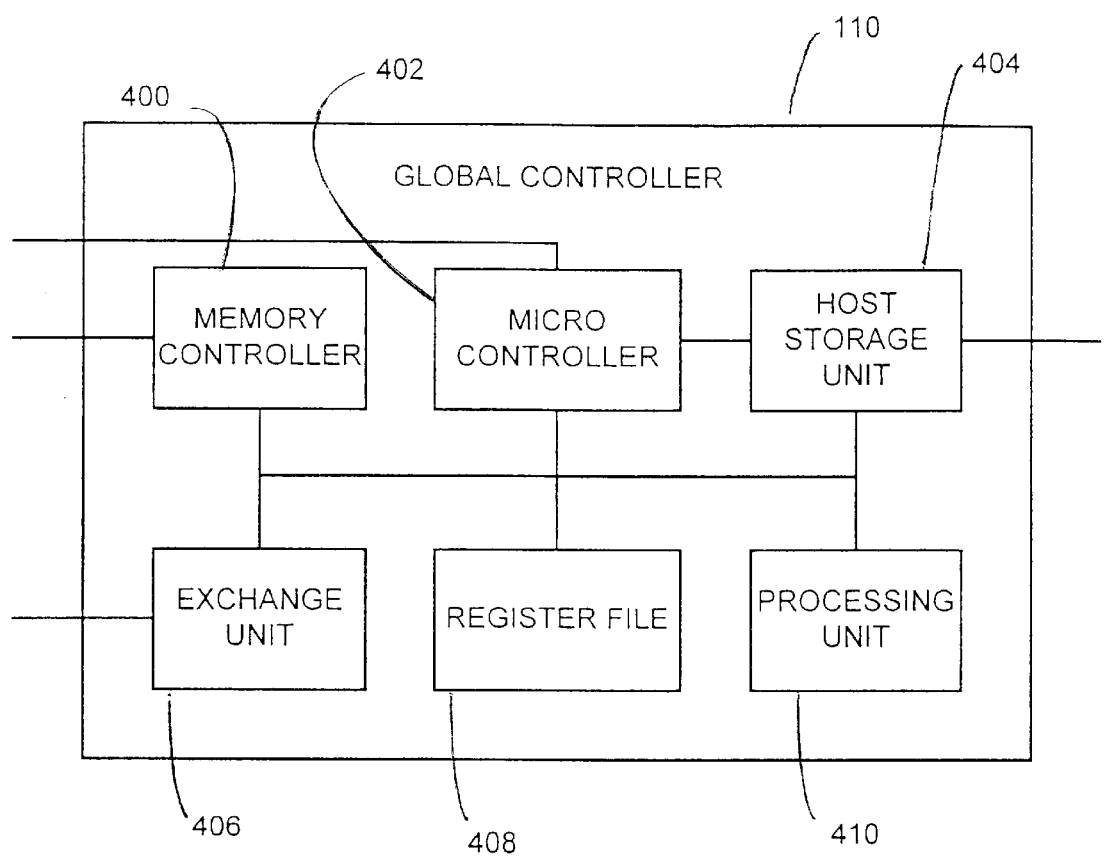
FIG. 11 is a schematic illustration in detail of the global controller of the encoding device of FIG. 3, constructed and operative in accordance with another preferred embodiment of the invention.

Reference is now made to FIG. 11, which is a schematic illustration in detail of global controller 110, of FIG. 3, constructed and operative in accordance with another preferred embodiment of the invention.

Global controller 110 includes a memory controller 400, an exchange unit 406, a register file 408, a processing unit 410, a host storage 404 and a micro-controller 402. The input of the micro-controller 402 is connected to the input of the global controller 110. The micro-controller 402 is connected to the memory controller 400, exchange unit 406, register file 408, processing unit, host storage 404 and to output of global controller 110. The external storage interface of the global controller 110 is connected to the memory controller 400. The input/output of the memory controller 400 is connected to the input/output of the global controller 110 respectively. The exchange unit 406 is connected to the register file 408. The register file 408 is connected to the processing unit 410 and to the host storage 404 of the global controller 110. The host storage 404 is connected to the host interface 120 (FIG. 3).

With further reference to FIG. 3, the global controller 110 schedules, synchronizes and controls motion estimation processor 108, digital signal processor 104, bit-stream processor 102 and video input processor 106. The global controller 110 lo controls the internal data transfer of device 100 and the external data transfer from device 100 to external devices such as memory unit 122, an external host, and the like. The global controller 110 can also initializes and performs a variety of testing procedures on motion estimation processor 108, digital signal processor 104, bit-stream processor 102 and video input processor 106 and also memory unit 122. The global controller 110 is a massively parallel processor, capable of simultaneous execution of computational operations, internal data transfer and external data transfer.

The global controller 110 operates in two modes: programming and operational. Global controller 110 is operative to run according to both modes at the same time.

According to the programming mode, an external host loads the data and control parameters to the host storage 404. The external host instruct the global controller 110 to perform according to the operational mode by loading a predetermined control signal into the host storage 404.

According to the operational mode, the micro-controller 402 is synchronized to an external video source by the video synchronization signal which comes from the video input processor 106 (FIG. 3).

The micro-controller 402 provides control and synchronization signals to the motion estimation processor 108, the digital signal processor 104, the bit-stream processor 102 and the video input processor 106. The micro-controller 402 can also instruct each of these units to perform in accordance with a programming mode or an operational mode.

According to the operational mode, the global controller 110 loads a new frame from the video input processor 106 to the memory controller 400. The memory controller 400 transfers this data to the external storage. The memory controller 400 also reads the current and reference frames macro-blocks from the external storage and transfers them to the motion estimation processor 108 (FIG. 3).

The memory controller 400 provides the control signals, addresses and the like to memory unit 122 (FIG. 3).

According to the operational mode, the exchange unit 406 of the global controller 110 reads and writes different data items to and from the motion estimation processor 108, the digital signal processor 104, the bit-stream processor 102 and the video input processor 106.

The exchange unit 406 transfers the data to and from the register file 408. In order to support the simultaneous parallel processing of multiple macro-blocks in device 100, register file 408 maintains a memory structure such as a stack, which contains the sets of parameters associated with each macro-block.

This memory structure can be divided into multiple stacks of variable depth. The processing unit 410 can read the data from the register file 408, perform various arithmetic and logical operations, and store the processed data back into register file 408.

The register file 408 can access the host storage 404 to retrieve the data which an external host loaded into the host storage 404 during the programming mode.

The register file 408 can also transfer the data to the host storage 404, such that an external host can access the data during both programming and operational modes.

Figure 12:
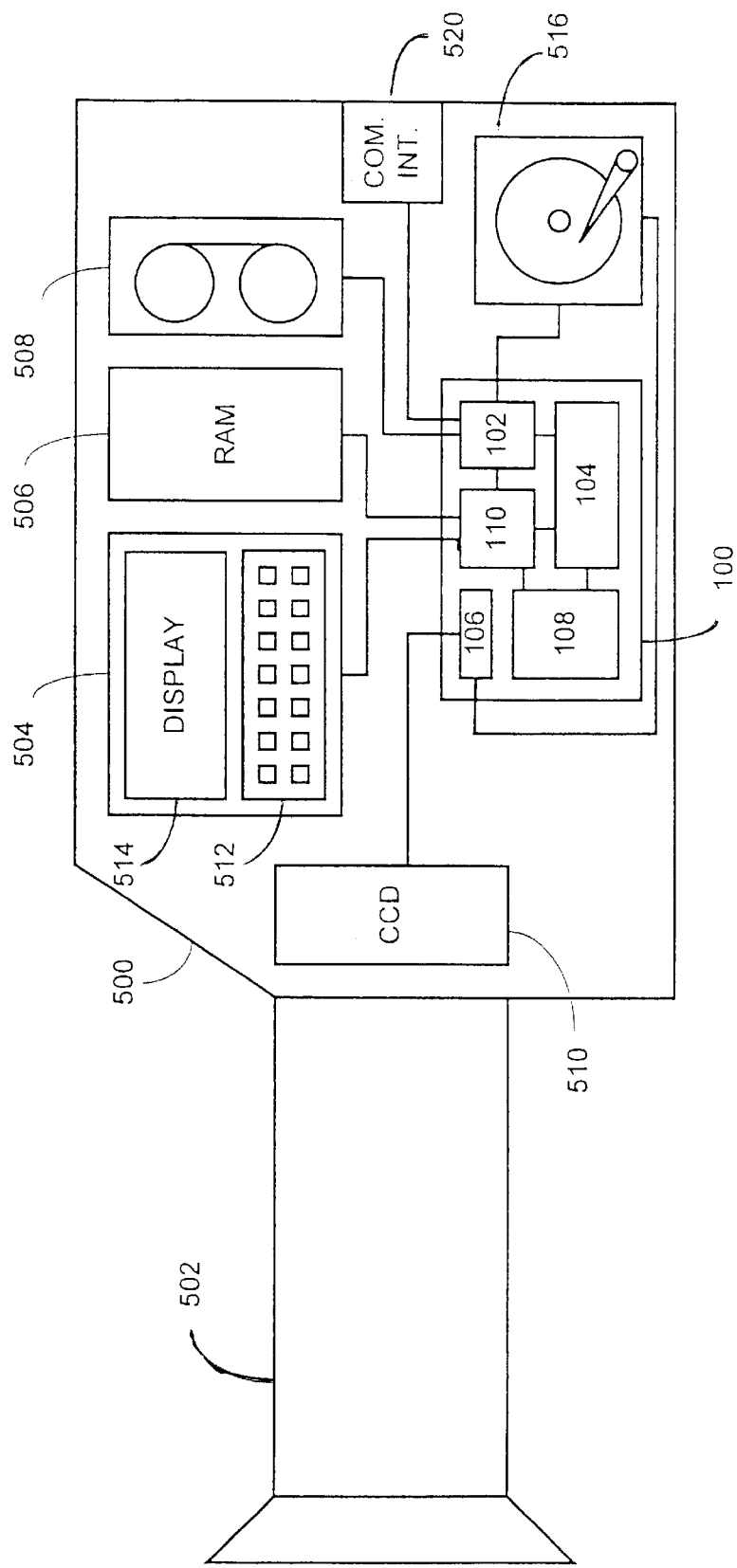
FIG. 12 is a schematic illustration in detail of the encoding device of FIG. 3. incorporated in a video camera, constructed and operative in accordance with a further preferred embodiment of the invention.

Reference is now made to FIG. 12, which is a schematic illustration of encoding device 100, incorporated in a video camera, generally referenced 500, constructed and operative in accordance with another preferred embodiment of the invention.

Camera 500 includes an optical assembly 502, a charge coupled device (CCD) 510, a host interface 504, a random access memory 506, a communication interface 520, two storage units 508 and 516 and encoding device 100.

Device 100 is connected to charge coupled device 510, host interface 504, a communication interface 520, random access memory 506 and storage units 508 and 516.

Host interface 504 includes a display 514 and a keyboard 512 and can be used to display the status of encoding device 100 as well as to receive instructions from a user.

Storage unit 508 is a tape based storage device. Storage unit 516 is a disk based storage device, such as a magnetic hard drive, an optical storage device, a magneto-optical storage device and the like. It will be noted that other types of storage devices can also be used for this purpose, like semiconductor based memory units such as flash memory, RAM and the like.

CCD 510 converts light, arriving from the optical assembly 502, representing an image, into an electrical signal. CCD 510 is preferably a digital light sensitive device which can be replaced by an analog light sensitive device, followed by an analog to digital converter, for converting an analog video signal into a digital video signal.

Then, CCD 510 provides the digital video signal to video input processor 106, of encoding device 100. The encoding device 100 encodes the digital video signal, produces an encoded video signal and provides it at the output of bit-stream processor 102. During the encoding process, the encoding device 100 uses a random access memory 506 as a temporary storage area for video data as well as analysis data, produced by its inner components.

Encoding device 100 provides the encoded video signal to storage devices 508 and 516, and to communication interface 520.

It will be appreciated that any of the storage units 508 and 516 as well as the communication interface 520 can provide digital video signal as input for device 100. In the present example, storage device 516 is also connected to device 100 via the video input processor 106.

It will be noted that the present invention provides an encoding device which can easily be adapted to ISO/IEC 11172 (MPEG-1) as well as other encoding standards which are similar to MPEG such as ISO/IEC H.320, H.261 and H.263, as well as different motion JPEG methods.

It will be appreciated by persons skilled in the art that the present invention is not limited to what has been particularly shown and described hereinabove. Rather the scope of the present invention is defined by the claims which follow.

What is claimed is:

1. In a video encoding system including a video source providing multiple frame video signal, a compressed data interface, a host interface and a video encoding device, the video encoding device comprising:

a video input processor for receiving said video signal;

a global controller, for controlling the global operations of said video encoding device;

a motion estimation processor, operatively coupled to said global controller;

a digital signal processor, operatively coupled to said global controller and to said motion estimation processor; and a bit-stream processor operatively coupled to said digital signal processor, said global controller and said compressed data interface, wherein said global controller stores encoding commands received from said host interface thereby programming said video input processor, said motion estimation processor, said digital signal processor and said bit-stream processor.

2. A video camera comprising:

an optical assembly;

a light sensitive device, detecting light via said optical assembly, thereby producing a video signal; and a video encoding device, operatively coupled to said light sensitive device, said video encoding device comprising:

a video input processor for receiving said video signal;

a global controller, for controlling the global operation of said video encoding device;

a motion estimation processor, operatively coupled to said global controller;

a digital signal processor, operatively coupled to said global controller and to said motion estimation processor, and a bit-stream processor operatively coupled to at least to said digital signal processor and said global processor, wherein said global processor stores encoding commands received from a host interface thereby programming said video input processor, said motion estimation processor, said digital signal processor and said bit-stream processor.

3. The video encoding device according to claim 1, further comprising the video input processor being operatively coupled to the global controller, and the input of the video input processor being operatively coupled to a digital video source via a digital video interface, wherein the video input processor is adapted to capture a video signal, preprocess the video signal, accumulate preprocessed video into data blocks, and transfer the data blocks to the global controller.

4. The video encoding device according to claim 1, wherein the video input processor at least comprises:

a video capture unit having a video capture unit input operatively coupled to an input of the video input processor;

a video preprocessor having a video preprocessor input operatively coupled to the input of the video input processor, and the video preprocessor also operatively coupled to the video capture unit; and temporary video storage having a temporary video storage input operatively coupled to the input of the video input processor, and the temporary video storage also operatively coupled to the video preprocessor and the global controller.

5. The video encoding device according to claim 1, wherein the global controller is adapted to retrieve and load a current picture macro-block and a reference picture macro block from a memory unit into the motion estimation processor, and to control and schedule video processing, govern data transfer, and connect the video encoding device to an external host.

6. The video encoding device according to claim 1, wherein the motion estimation processor is adapted to compare a current picture macro-block with a reference picture macro-block to produce an estimation of motion of the current picture macro-block, and the motion estimation processor is adapted to use the estimation to remove temporal redundancy of the video signal, wherein the motion estimation processor transfers the estimation to the global controller and transfers the current picture macro-block and the reference picture macro-block to the digital signal processor.

7. The video encoding device according to claim 1, wherein the motion estimation processor at least comprises:

a low resolution processor adapted to perform a resolution reduction to decrease an amount of image data;

a full resolution processor adapted to perform at least one search to produce full resolution motion analysis;

a hyper resolution processor adapted to multiply resolution of image data to enable motion prediction;

a local-controller adapted to control and synchronize the low resolution, full resolution and hyper resolution processors, the processors are adapted to operate in one of parallel and serial operation;

a frame input operatively coupled to an input of the low resolution processor;

a frame output operatively coupled to the hyper resolution processor; and a control port operatively coupled to the global controller.

8. The video encoding device according to claim 1, wherein the digital signal processor is adapted to reduce spatial redundancy in a video signal by producing a sequence of compression commands and transferring a sequence of compressed data to the bit-stream processor and to the global controller.

9. The video encoding device according to claim 1, wherein the digital signal processor at least comprises:

a master controller adapted to distribute control instructions and receive processed data;

a random access memory (RAM) unit; and a plurality of processing units, each processing unit being operatively coupled to the master controller and the RAM unit, wherein each processing unit is able to access data blocks associated with other processing units, and all processing units are adapted to execute different operations in parallel.

10. The video encoding device according to claim 1, wherein the bit-stream processor is adapted to perform encoding procedures, compress data into a standard format, and transfer the standard format data to a compressed data interface.

11. The video encoding device according to claim 1, wherein the bit-stream processor at least comprises:

a local processing unit adapted to receive data and control parameters from the global controller;

an entropy encoder adapted to load data from local processing unit registers and perform encoding procedures to produce encoded data;

a temporary coefficient storage being adapted to be loaded with preprocessed coefficients from the digital signal processor;

a bit-stream formatter adapted to read the encoded data from the entropy encoder and format the encoded data into a standard bit-stream;

an output buffer providing temporary storage to bit-stream data; and a micro-controller providing controlling and synchronizing signals to the local processing unit, the entropy encoder, the temporary coefficient storage, the bit-stream formatter, and the output buffer.

12. The video encoding device according to claim 1, wherein the device is adapted to operate in at least two modes selected from a programming mode and an operational mode, and wherein the device is operatively adapted to operate in both modes simultaneously.

13. The video camera according to claim 2, further comprising the video input processor being operatively coupled to the global controller, and the input of the video input processor being operatively coupled to a digital video source via a digital video interface, wherein the video input processor is adapted to capture a video signal, preprocess the video signal, accumulate preprocessed video into data blocks, and transfer the data blocks to the global controller.

14. The video camera according to claim 2, wherein the video input processor at least comprises:
a video capture unit having a video capture unit input operatively coupled to an input of the video input processor;
a video preprocessor having a video preprocessor input operatively coupled to the input of the video input processor, and the video preprocessor also operatively coupled to the video capture unit; and
temporary video storage having a temporary video storage input operatively coupled to the input of the video input processor, and the temporary video storage also operatively coupled to the video preprocessor and the global controller.

15. The video camera according to claim 2, wherein the global controller is adapted to retrieve and load a current picture macro-block and a reference picture macro block from a memory unit into the motion estimation processor, and to control and schedule video processing, govern data transfer, and connect the video encoding device to an external host, and the video encoding device is adapted to operate in at least two modes selected from a programming mode and an operational mode, and the video encoding device is operatively adapted to operate in the programming and operational modes simultaneously.

16. The video camera according to claim 2, wherein the motion estimation processor is adapted to compare a current picture macro-block with a reference picture macro-block to produce an estimation of motion of the current picture macro-block, and the motion estimation processor is adapted to use the estimation to remove temporal redundancy of the video signal, wherein the motion estimation processor transfers the estimation to the global controller and transfers the current picture macro-block the reference picture macro-block to the digital signal processor.

17. The video camera according to claim 2, wherein the motion estimation processor at least comprises:
a low resolution processor adapted to perform a resolution reduction to decrease an amount of image data;
a full resolution processor adapted to perform search to produce full resolution motion analysis;
a hyper resolution processor adapted to multiply resolution of image data to enable motion prediction;
a local-controller adapted to control and synchronize the low resolution, full resolution and hyper resolution processors, the processors are adapted to operate in one of parallel and serial operation;
a frame input operatively coupled to an input of the low resolution processor;
a frame output operatively coupled to the hyper resolution processor; and
a control port operatively coupled to the global controller.

18. The video camera according to claim 2, wherein the digital signal processor is adapted to reduce spatial redundancy in a video signal by producing a sequence of compression commands and transferring a sequence of compressed data to the bit-stream processor and to the global controller.

19. The video camera according to claim 2, wherein the digital signal processor at least comprises:
a master controller adapted to distribute control instructions and receive processed data;
a random access memory (RAM) unit; and
a plurality of processing units, each processing unit being operatively coupled to the master controller and the RAM unit, wherein each processing unit is able to access data blocks associated with other processing units, and all processing units are adapted to execute different operations in parallel.

20. The video camera according to claim 2, wherein the bit-stream processor is adapted to perform encoding procedures, compress data into a standard format, and transfer the standard format data to a compressed data interface.

21. The video camera according to claim 2, wherein the bit-stream processor at least comprises:
a local processing unit adapted to receive data and control parameters from the global controller;
an entropy encoder adapted to load data from local processing unit registers and perform encoding procedures to produce encoded data;
a temporary coefficient storage adapted to be loaded with preprocessed coefficients from the digital signal processor;
a bit-stream formatter adapted to read the encoded data from the entropy encoder and format the encoded data into a standard bit-stream;
an output buffer providing temporary storage to bit-stream data; and
a micro-controller providing controlling and synchronizing signals to the local processing unit, the entropy encoder, the temporary coefficient storage, the bit-stream formatter, and the output buffer.

22. A video encoding device, comprising:
a global controller, wherein the global controller controls global operations of the video encoding device, stores encoding commands received from an external interface, and programs a plurality of processors operatively coupled to the global controller; and
a motion estimation processor operatively coupled to and programmable by the global controller, the motion estimation processor at least comprising:
a low resolution processor adapted to perform a resolution reduction to decrease an amount of image data;
a full resolution processor adapted to perform at least one search to produce full resolution motion analysis;
a hyper resolution processor adapted to multiply resolution of image data to enable motion prediction;
a local-controller adapted to control and synchronize the low resolution, full resolution and hyper resolution processors, the processors are adapted to operate in one of parallel and serial operation;

a frame input operatively coupled to an input of the low resolution processor;

a frame output operatively coupled to the hyper resolution processor; and a control port operatively coupled to the global controller.

23. The video encoding device according to claim 22, further comprising a video input processor operatively coupled to and programmable by the global controller, and an input of the video input processor being operatively coupled to a digital video source via a digital video interface, wherein the video input processor is adapted to capture a video signal, preprocess the video signal, accumulate preprocessed video into data blocks, and transfer the data blocks to the global controller.

24. The video encoding device according to claim 22, further comprising a video input processor operative coupled to and programmable by the global controller, the video input processor at least comprising:

a video capture unit having a video capture unit input operatively coupled to an input of the video input processor;

a video preprocessor having a video preprocessor input operatively coupled to the input of the video input processor, and the video preprocessor also operatively coupled to the video capture unit; and temporary video storage having a temporary video storage input operatively coupled to the input of the video input processor, and the temporary video storage also operatively coupled to the video preprocessor and the global controller.

25. The video encoding device according to claim 22, wherein the global controller is further adapted to retrieve and load a current picture macro-block and a reference picture macro block from a memory unit into the motion estimation processor, and to control and schedule video processing, govern data transfer, and connect the video encoding device to an external host through the external interface.

26. The video encoding device according to claim 22, further comprising a motion estimation processor operatively coupled to and programmable by the global controller, the motion estimation processor being adapted to compare a current picture macro-block with a reference picture macro-block to produce an estimation of motion of the current picture macro-block, and the motion estimation processor being adapted to use the estimation to remove temporal redundancy of the video signal, wherein the motion estimation processor transfers the estimation to the global controller and transfers the current picture macro-block and the reference picture macro-block to the digital signal processor.

27. The video encoding device according to claim 22, further comprising a digital signal processor operatively coupled to and programmable by the global controller, the digital signal processor being adapted to reduce spatial redundancy in a video signal by producing a sequence of compression commands and transferring a sequence of compressed data to the bit-stream processor and to the global controller.

28. The video encoding device according to claim 22, further comprising a digital signal processor operatively coupled to and programmable by the global controller, the digital signal processor at least comprising:

a master controller adapted to distribute control instructions and receive processed data;

a random access memory (RAM) unit; and a plurality of processing units, each processing unit being operatively coupled to the master controller and the RAM unit, wherein each processing unit is able to access data blocks associated with other processing units, and all processing units are adapted to execute different operations in parallel.

29. The video encoding device according to claim 22, further comprising a bit-stream processor operatively coupled to and programmable by the global controller, the bit-stream processor being adapted to perform encoding procedures, compress data into a standard format, and transfer the standard format data to a compressed data interface.

30. A video encoding device, comprising:

a global controller, wherein the global controller controls global operations of the video encoding device, stores encoding commands received from an external interface, and programs a plurality of processors operatively coupled to the global controller; and a bit-stream processor operatively coupled to and programmable by the global controller, the bit-stream processor at least comprising:

a local processing unit adapted to receive data and control parameters from the global controller;

an entropy encoder adapted to load data from local processing unit registers and perform encoding procedures to produce encoded data;

a temporary coefficient storage being adapted to be loaded with preprocessed coefficients from the digital signal processor;

a bit-stream formatter adapted to read the encoded data from the entropy encoder and format the encoded data into a standard bit-stream;

an output buffer providing temporary storage to bit-stream data; and a micro-controller providing controlling and synchronizing signals to the local processing unit, the entropy encoder, the temporary coefficient storage, the bit-stream formatter, and the output buffer.

* * * * *